May 5, 1953     H. T. DINKELKAMP     2,637,304
VALVE MECHANISM FOR RECIPROCATING FLUID MOTORS
Filed Jan. 5, 1950     2 SHEETS—SHEET 1
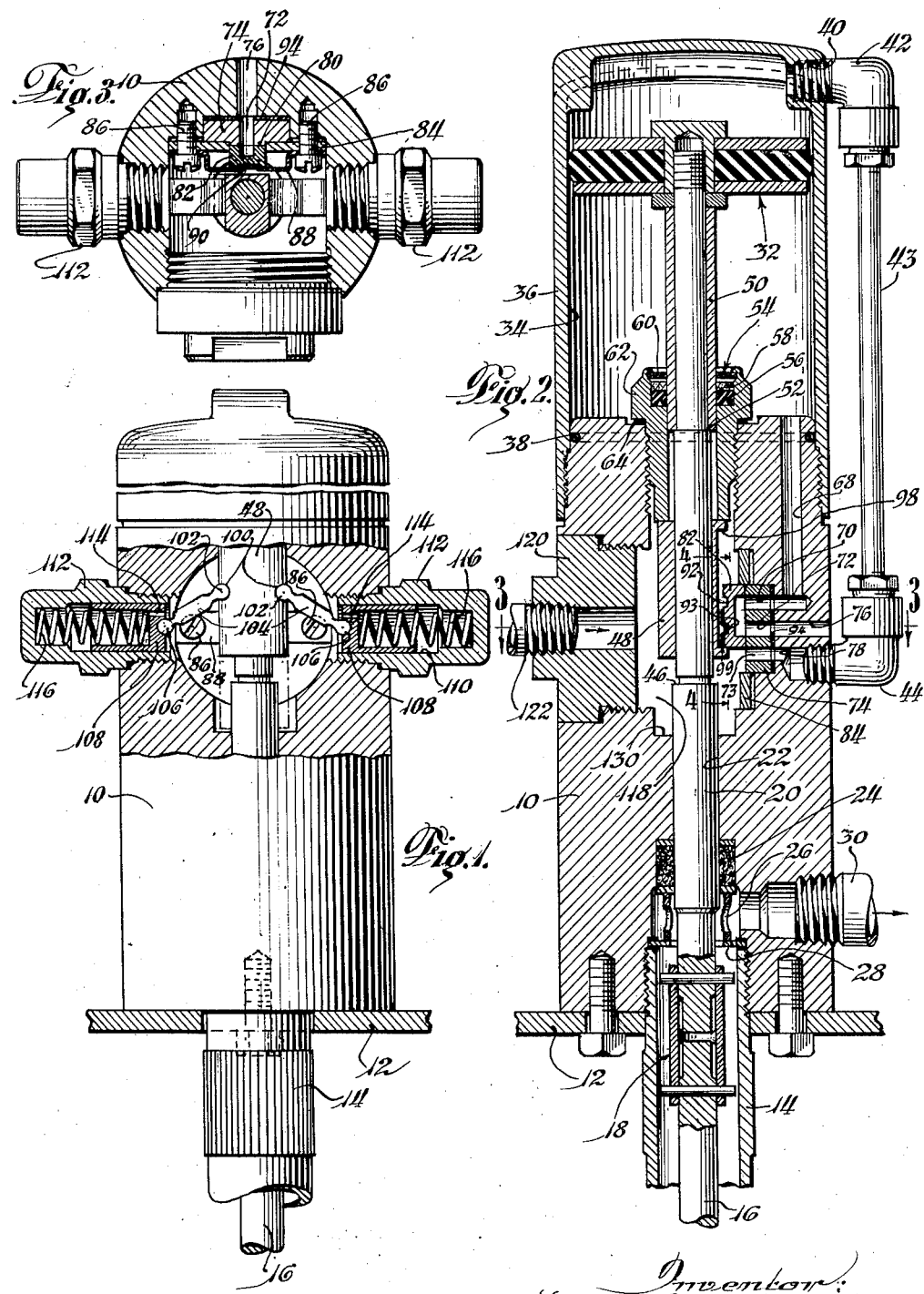
Inventor:
Henry T. Dinkelkamp
By Hinkle, Horton, Ahlberg, Hansmann & Wupper
Attorneys.

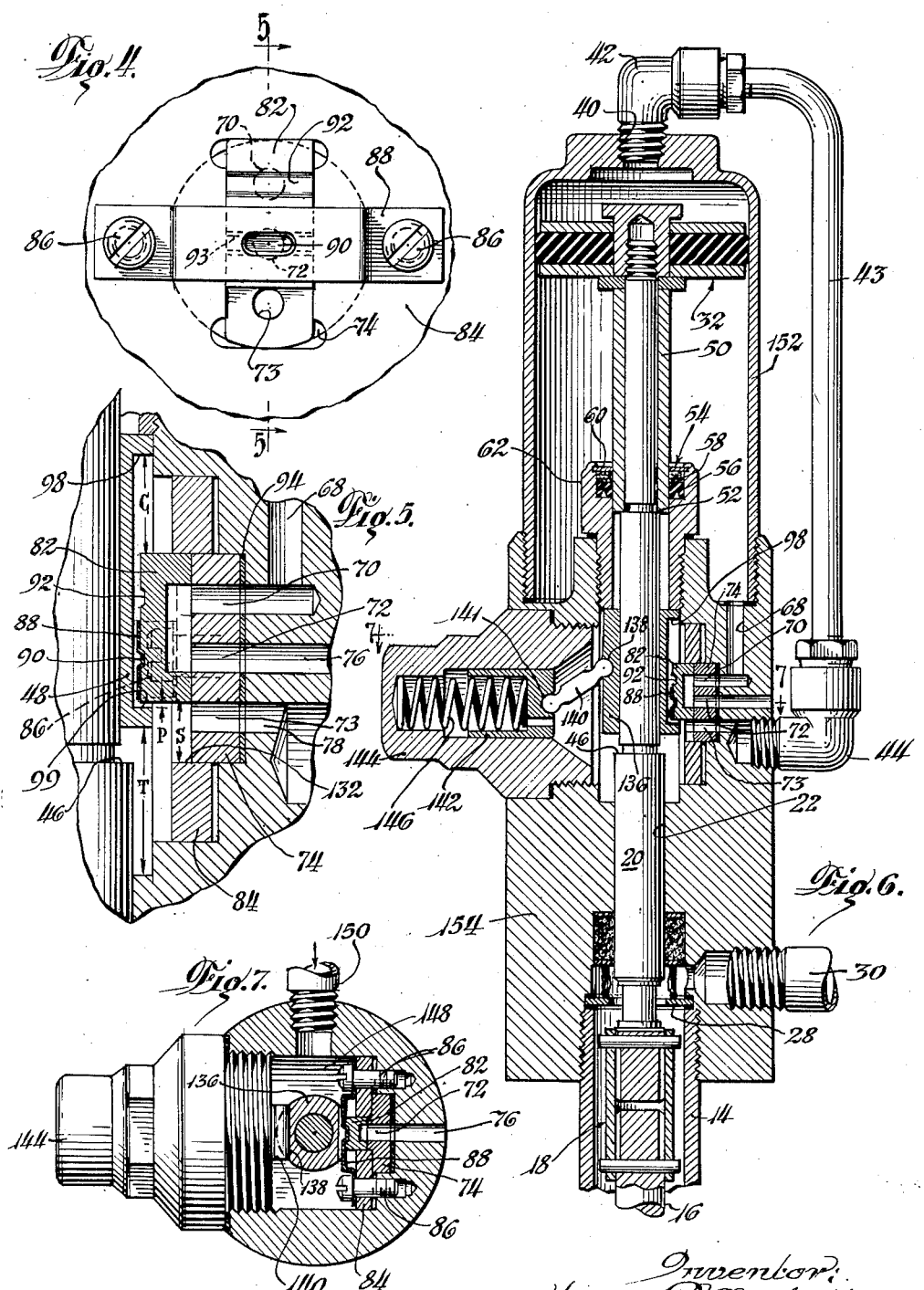

Patented May 5, 1953

2,637,304

UNITED STATES PATENT OFFICE 2,637,304

VALVE MECHANISM FOR RECIPROCATING FLUID MOTORS

Henry T. Dinkelkamp, Chicago, Ill., assignor to Stewart-Warner Corporation, Chicago, Ill., a corporation of Virginia Application January 5, 1950, Serial No. 136,893

9 Claims. (Cl. 121—164)

1

My invention relates generally to fluid pressure operated reciprocating motors, such as are used for the operation of grease pumps from a compressed air supply.

Some difficulty has been experienced in devising a simple and reliable reciprocating motor operable by compressed air for use as a part of a lubricant pumping mechanism, even though the general principles of operation of such motors have been known for a long time. One of the difficulties encountered in the construction of motors of this type is caused by the fact that when such motors are connected for the operation of a lubricant pump, the usual practice is to keep the pump connected to the source of compressed air continuously, and control the operation of the pump solely by the means of the valve by which the discharge of lubricant from the pump is controlled. Because of the nature of the load upon the reciprocating motor, and the manner in which the apparatus is customarily operated, it is essential that the motor not have any dead center positions and that it be capable of operating at various speeds. Because of these factors, it is necessary that the D-slide valve, by which the supply of air to the opposite ends of the motor cylinder is controlled, be operated without the benefit of inertia forces, that it be light in weight to enable it to be operated rapidly, and that it be of very simple construction so that the motor will operate for long periods of time without attention upon the part of the user.

It is therefore a primary object of my invention to provide an improved reciprocating fluid pressure operated motor which is very simple in construction and operation, which may easily be serviced, which will operate at any reasonable speed, which may be stopped and will restart in any position in its operating cycle, and which may be economically manufactured.

A further object is to provide an improved and simplified spring toggle mechanism for the operation of a D-slide valve.

A further object is to provide an improved reciprocating pneumatic motor operated lubricant pump in which the motor valve mechanism is located between the motor cylinder and the lubricant pump so that the valve mechanism will be lubricated by wipage from the pump piston rod.

2

Other objects will be apparent from the following description, reference being had to the accompanying drawings, in which Fig. 1 is a side elevational view of the motor with portions broken away to show parts of the spring toggle snap-over mechanism;

Fig. 2 is a central vertical sectional view of the motor, looking in a direction perpendicular to that of Fig. 1;

Fig. 3 is a horizontal sectional view, taken on the line 3—3 of Fig. 2;

Fig. 4 is an enlarged scale sectional view, taken on the line 4—4 of Fig. 2;

Fig. 5 is a fragmentary sectional view, taken on the line 5—5 of Fig. 4;

Fig. 6 is a central vertical sectional view of a modified form of the invention; and Fig. 7 is a horizontal sectional view, taken on the line 7—7 of Fig. 6.

The motor shown in Figs. 1 to 5 comprises a body 10 which may be machined from cold rolled bar steel stock, and is secured to a suitable support 12. Threaded into the lower end of the body 10 is a lubricant pumping cylinder 14 having a piston actuating rod 16 secured thereto. A self-aligning coupling 18 connects the pump piston rod 16 to a motor piston rod 20 which is reciprocable in a bore 22, and the lower end of which is suitably sealed by a packing gland 24, this packing including a perforated hollow cylinder pressure ring 26 and a washer 28, thus permitting lubricant to be forced from the cylinder 14 to a lubricant discharge pipe 30.

The piston rod 20 has a piston 32 suitably secured to the upper end thereof, this piston rod being reciprocable in a cylinder bore 34 formed in a cup-shaped cap 36 threaded to the upper end of the body 10. The joint between the body 10 and the wall of the bore 34 is sealed by an O-ring 38 preferably made of a synthetic rubber material. Because of the use of this sealing ring, the cylinder cup 36 need not be tightly screwed to the end of the body 10. Instead, it may be screwed upon the body a sufficient distance for the necessary mechanical strength of the joint into a position such that a threaded port 40 at the upper end of the cylinder cup is in proper position for the reception of an elbow 42 which is connected by a pipe 43 with an elbow 44 threaded in the pump body 10. Thus, no close tolerances are required in the manufacture of these parts, and the assembly thereof is greatly facilitated.

The piston rod 20 is provided with an undercut shoulder 46 for engagement with a valve operator 48, and has a sleeve 50 clamped between a second shoulder 52 and the piston 32. The sleeve 50 projects through a suitable packing gland 54, this gland comprising a V-grooved annular sealing washer 56 of synthetic rubber, which is backed by a leather washer 58, the two washers 56 and 58 being held in place by a retaining ring 60 which is crimped to the packing bushing 62. The packing bushing 62 is threaded in the upper end of the body 10 and its joint therewith is sealed by a gasket 64.

A passageway 68 connects the lower end of the cylinder bore 34 to a valve port 70 formed in a valve seat plate 74, this plate also having ports 72 and 73 formed therein. The port 72 is in communication with the atmosphere through exhaust passageway 76, while the port 73 communicates with the elbow 44 and thus with the upper end of the cylinder bore 34 through a passageway 78.

As best shown in Fig. 3, the valve seat plate has a raised valve seat surface 80 which may readily be ground and lapped so as to provide a smooth surface for engagement with a D-slide valve 82. The valve seat plate 74 is tightly secured over the openings of the passageways 68, 76, and 78 by a clamping plate 84 and a pair of cap screws 86 which are threaded in the body 10. The cap screws also hold in place a generally U-shaped detent strip 88 which is perforated for the reception of the cap screws 86, and which at its center has a detent dimple 90 formed therein, this dimple 90 being adapted to engage in either of two complementary grooves 92 and 93 (Fig. 5) which are formed in the adjacent surface of the D-slide valve 82. A perforated sheet gasket 94 is interposed between the valve seat plate 74 and the opposed surface of the body 10 to seal the joint and make it unnecessary to finish the adjacent surfaces of the body and valve seat plate with any high degree of accuracy.

The slide valve operator 48 is freely slidable upon the piston rod 20 between the shoulder 46 thereof and the lower end of the sleeve 50, and is adapted to be shifted by engagement with the shoulder 46 near the completion of the upward stroke of the piston 32, and is adapted to be engaged by the lower end of sleeve 50 near the completion of the downward stroke of the piston. It will be noted that the operator 48 has shoulders 98 and 99 near the ends thereof for engagement with the D-slide valve 82.

In order to secure rapid and reliable shifting of the D-slide valve between its two operative positions, it is desirable to provide means for causing the operator 48 to shift between its two positions with a movement which is extremely rapid during the time that either shoulder 98 or 99 of the operator is in contact with the D-slide valve 82. The means for accomplishing the snap action of the D-slide valve is best shown in Fig. 1, from which it will be noted that the operator 48 is provided with a pair of diametrically opposite chordal grooves 100 for the reception of the cylindrical ends 102 of a pair of toggle links 104. The opposite ends of the toggle links 104 have similar cylindrically formed ends 106 which bear in semi-cylindrically shaped grooves which extend diametrically across the faces of plungers 108. The plungers 108 slide freely in bores 110 formed in hollow spring retaining caps 112 which are threaded into the body 10 diametrically opposite each other. These plungers 108 are provided with vent openings 114 so that their movement is not impeded by differences in pressure on the opposite sides thereof and the plungers are urged toward each other by compressed coil springs 116.

The valve chest 118 is formed by a radially extending bore which, after assembly of the valve mechanism, is closed by a bushing 120 which is threaded to receive a compressed air supply pipe 122. By virtue of the size of the bore forming the valve chest 118, the machining operations for the valve seat parts, including drilling, tapping, and facing, may readily be performed, so that the body 10 may be made out of cold rolled bar steel stock, and the cost of production considerably reduced.

Except when the lubricant pump is not to be used for an extended period of time, air is continuously supplied through the pipe 122 and bushing 120 into the valve chest 118. The parts of the valve mechanism and piston are shown in Fig. 2 in the position assumed by them immediately following the commencement of a down stroke of the piston 32, for it will be noted that ports 73 are uncovered by the D-slide valve to permit flow of air under pressure to the upper end of the power cylinder 34 while the lower end of said cylinder is vented to the atmosphere through passageway 68, port 70, cavity in the D-slide valve 82, port 72, and passageway 76. It will be noted that the stream of air discharged from the passageway 76 is directed against the elbow 44 and the elbow thus acts partially as a deflector to break up the stream.

Whenever lubricant is permitted to flow from the discharge pipe 30, the piston 32 and all parts connected thereto, will move downwardly at a rate determined mainly by the rate at which lubricant is being dispensed. When the lower end of the sleeve 50 engages the upper end of the valve operator 48, it will carry the latter downwardly. Thereafter the operator will move downwardly with the piston rod 20 until its shoulder 98 comes close to the upper surface of the D-valve 82, for example, when the distance between the shoulder and the D-valve is about one-eighth of an inch. When the operator 48 has been moved to this position relative to the slide valve, the toggle links 104 will be at dead center position so that the slightest additional downward movement of the operator 48 will permit the springs 116 to expand and snap the operator 48 downwardly with a rapidly accelerating motion, so that when the shoulder 98 strikes the D-slide valve 82, it will have acquired sufficient momentum to overcome the inertia of the valve 82 and to overcome the restraining force applied by the detent spring 88 so as to force the dimple 90 of the latter out of the groove 93 and to cause the valve to move at high speed to the position in which the lower edge of the D-valve 82 engages the edge 132 of the retaining plate 84, at which time the detent dimple 90 will be in engagement with the groove 92.

In order that the operation of the valve be as above described, it is necessary that there be certain relationships between the dimensions of the parts of the valve mechanism. The throw T of the operator 48 (see Fig. 5) must be equal to the sum of the stroke S of the D-valve 82, plus the clearance C between the shoulder 98 and the part of the D-valve which it engages, minus P, the distance between the shoulder 99 and the other surface of the D-valve which is engaged by the latter shoulder. These dimensional relationships may be set forth in the formula: $T=C+S-P$. Furthermore, the dimension C should be greater than, or at least equal to, one-half the throw T of the operator 48, that is: $C \geq T/2$.

When the slide valve operating mechanism conforms to these dimensional relationships, the operator 48 will strike its lower limit stop 130 before the D-valve 82 strikes the surface 132 of the retaining plate 84, and the D-valve will complete its stroke due to its momentum, assisted by the action of the detent spring 88.

When the D-valve 82 is in its lower position, air pressure is supplied to the lower end of the power cylinder 34 and the piston 32 will commence its upward return stroke until the shoulder 46 on the piston stem 20 engages the lower end of the operator 48 and carries the latter upwardly past the center of its stroke, when the springs 116 will be effective to snap the operator 48 through the remainder of its stroke which is, of course, limited by the engagement of the operator with the lower end of the sleeve 62. Just after the operator 48 passes its center position, its shoulder 99 will engage the D-valve 82 and snap the latter upwardly to its original position, the upward stroke likewise being completed by the momentum of the valve since there is preferably slight play P between the shoulder 99 when both the D-valve 82 and operator 48 are in their uppermost positions. By virtue of this slight clearance or play P, the D-valve 82 is not required to bear the full hammering impact due to the momentum of the operator 48 and the action of the valve is therefore more smooth and less noisy with less wear on the surfaces of the D-valve which are contacted by the shoulders 98 and 99.

The invention may be embodied in a simplified form for use in smaller pumps to be manufactured at lower cost, as shown in Figs. 6 and 7. In this construction the D-valve and its seat, and the manner in which these parts are held in position, are identical with the corresponding parts previously described, and such similar parts have had similar reference characters applied thereto, and a description thereof will not be repeated since the parts are identical in function and operation and differ only in size and details of design.

In Figs. 6 and 7, the D-valve is actuated by an operator 136 which is similar to the operator 48, except that it has but a single groove 138 for the reception of the cylindrical end portion of a toggle link 140 which at its opposite end bears in a part cylindrical groove 141 extending diametrically across the face of a plunger 142. The latter is guided for free movement in a cap 144 and is forced inwardly by a compressed coil spring 146. Air under pressure is admitted to the chest 148 through a fitting 150.

Inasmuch as the air supply connection to the upper end of the power cylinder 152 is at the center thereof, this cylinder may be threaded to the body 154 in the customary manner. In other respects the form of the invention shown in Figs. 6 and 7 is the same as that described above with reference to Figs. 1 to 5. In both embodiments, the body 154 is preferably made of solid cold rolled bar stock, and the various parts and passageways are formed in this bar stock by simple drilling, boring, reaming, and tapping operations, the arrangement of the parts being such that no high degree of accuracy is required so that the machining operations may be efficiently performed.

The cost of the embodiment of Figs. 6 and 7 is reduced by virtue of the fact that but one spring pressed plunger is used, and because most of the other parts are smaller and lighter. Its operation is, however, substantially the same as that of the embodiment shown in Figs. 1 to 5.

In both embodiments of the invention, the D-valve is made as small and as light in weight as is practical, so that it may be operated very rapidly. In both forms of the invention the operating parts are easily accessible for inspection and replacement, and the valve, valve seat, and the packing glands, which are the parts most likely to require replacement due to wear, are small and easily replaced.

By virtue of the fact that the valve mechanism is positioned between the air cylinder and the lubricant cylinder, lubricant adhering to the piston rod 20, so called "wipage," will pass into the valve chest and lubricate all of the moving parts therein. Some of this lubricant will flow with the air to the motor cylinder and lubricate the parts moving therein. By thus locating the valve between the pump and the motor, the necessity for complicated operating connections between the piston rod and the valve mechanism is avoided. Furthermore, the arrangement of the toggle links and associated parts by which the valve operator is snapped between its operating positions, is simplified and the cost of the valve mechanism thereby substantially reduced.

A further advantage of thus locating the valve mechanism between the motor and pump, is that by this construction the body of the pump, its valve mechanism, and the body of the air motor are combined into a single part, thus further reducing the cost of the unit.

While I have shown and described preferred embodiments of my invention, it will be apparent that numerous variations and modifications theerof may be made without departing from the underlying principles of the invention. I therefore desire, by the following claims, to include within the scope of the invention all such variations and modifications by which substantially the results of my invention may be obtained through the use of substantially the same or equivalent means.

I claim:

1. A valve mechanism for a fluid pressure operated motor which includes a reciprocating piston rod having a pair of spaced stops, comprising, a valve seat member having a raised valve seat surface portion and having three ports in the seat surface, a two-position D-slide valve having a pair of transverse grooves therein, a retainer for the valve seat member having an opening for the raised valve seat surface portion thereof and of sufficient thickness to form a guide and end stops for the valve, a spring detent cooperable with the grooves of the valve to hold the latter in either of its positions, a valve operator slidable relative to the piston rod between the stops thereof, said operator having parts thereof engageable with the valve to move the latter between its two operative positions, the spacing of the parts being much greater than the spacing of the surfaces of the valve engaged by the parts, and a quick snap-over mechanism connected to said operator.

2. A D-slide valve structure comprising a body having adjacent passageways therein, a valve seat plate positioned over the ends of the passageways and having aligned ports respectively in communication with the passageways, said plate having a ridge forming a valve seat surface, a two-position D-slide valve reciprocable over the valve seat and having an irregularity in its surface spaced from the seat surface, a resilient detent member having a part cooperable with the irregularity in the slide valve to hold the latter in either of its two operative positions, a clamping plate having an opening receiving the raised portion of the valve seat plate and forming stops to limit the stroke of the slide valve, means to secure the clamping plate to the body, and a reciprocatory operator having a snap action operable near the ends of its stroke to engage the slide valve and move it rapidly between its operative positions.

3. A D-slide valve structure comprising a body having adjacent passageways therein, a valve seat plate positioned over the ends of the passageways and having aligned ports respectively in communication with the passageways, said plate having a ridge forming a valve seat surface, a D-slide valve reciprocable over the valve seat surface and having two operative positions, detent means cooperable with the slide valve to hold the latter in either of its two operative positions, a clamping and valve guide plate having an opening receiving the raised portion of the valve seat plate and forming stops to limit the stroke of the slide valve, means to secure the clamping plate to the body, and a reciprocatory snap action operator operable after it has passed the center of its stroke to engage the slide valve and move it rapidly between its operative positions.

4. A valve mechanism for a fluid pressure operated motor which includes a reciprocating piston rod, comprising a valve seat member having three ports in the seat surface, a two-position D-slide valve cooperable with the valve seat, a spring detent cooperable with the valve to hold the latter in either of its positions, a valve operator having parts thereof engageable with the valve to move the latter between its two operative positions, the spacing of the parts being much greater than the spacing of the surfaces of the valve engaged by the parts, means moving with the piston rod to engage and move the operator near the ends of the strokes of the piston rod, a spring pressed plunger movable in a direction perpendicular to the movement of the operator, and a toggle link having its ends pivotally connected to the plunger and to the operator respectively.

5. A D-slide valve structure comprising a body having adjacent passageways therein, a valve seat plate positioned over the ends of the passageways and having aligned ports respectively in communication with the passageways, said plate having a ridge forming a valve seat surface, a D-slide valve reciprocable over the valve seat, a clamping plate having an opening receiving the raised portion of the valve seat plate and forming a guide and stops to limit the stroke of the slide valve, a resilient detent element engageable with the slide valve to hold it in either of two positions, and means to secure both the detent element and the clamping plate to the body.

6. A valve mechanism for a fluid pressure operated motor which includes a reciprocating piston rod, comprising a valve seat member having three ports in the seat surface, a two-position D-slide valve cooperable with the valve seat, a spring detent cooperable with the valve to hold the latter in either of its positions, a valve operator having parts thereof engageable with the valve to move the latter between its two operative positions, the spacing of the parts being much greater than the spacing of the surfaces of the valve engaged by the parts, means moving with the piston rod to engage and move the operator near the ends of the strokes of the piston rod, a pair of spring pressed plungers movable in a direction perpendicular to the movement of the operator, and toggle links having their ends pivotally connected to the plungers and to the operator respectively.

7. A D-slide valve structure comprising a body having adjacent passageways therein, a valve seat plate positioned over the ends of the passageways and having aligned ports respectively in communication with the passageways, said plate having a ridge forming a valve seat surface, a D-slide valve reciprocable over the valve seat surface and having two operative positions, a resilient detent cooperable with the slide valve to hold the latter in either of its two operative positions, a unitary clamping and valve guide plate having an opening receiving the raised portion of the valve seat plate and forming a guide and stops to limit the stroke of the slide valve, means to secure the clamping plate and detent to the body, and a reciprocatory snap action operator operable after it has passed the center of its stroke to engage the slide valve and move it rapidly between its operative positions.

8. A valve mechanism for a fluid pressure operated motor which includes a reciprocating piston, comprising, a valve seat member having a raised valve seat surface portion and having three ports in the seat surface, a two-position D-slide valve having a pair of transverse grooves therein, a retainer for the valve seat member having an opening for the raised valve seat surface portion thereof and of sufficient thickness to form a guide and end stops for the valve, a spring detent cooperable with the grooves of the valve to hold the latter in either of its positions, a valve operator, actuating means moved by the piston and engaging the operator near the ends of the stroke of the piston, said operator having parts engageable with the valve to move the latter between its two operative positions, the spacing of the parts being much greater than the spacing of the surfaces of the valve engaged by the parts, and a quick snap-over mechanism connected to said operator to move the latter rapidly during the last half of its stroke in both directions.

9. A D-slide valve structure comprising a body having adjacent passageways therein, a valve seat plate positioned over the ends of the passageways and having aligned ports respectively in communication with the passageways, said plate having a ridge forming a valve seat surface, a two-position D-slide valve reciprocable over the valve seat and having an irregularity in its surface spaced from the seat surface, a resilient detent member having a part cooperable with the irregularity in the slide valve to hold the latter in either of its two operative positions, a clamping plate having an opening receiving the raised portion of the valve seat plate and forming stops to limit the stroke of the slide valve, means to secure the resilient detent and clamping plate to the body, a reciprocatory operator, and resilient means to cause the operator rapidly to complete its strokes in both directions after it has passed the center of its stroke, said operator being conformed to engage the slide valve and move it rapidly between its operative positions only after the operator has moved past the center of its stroke.

HENRY T. DINKELKAMP.

References Cited in the file of this patent

UNITED STATES PATENTS

| Number | Name | Date |
|---|---|---|
| 1,352,504 | Folberth | Sept. 14, 1920 |
| 1,841,634 | Rolstad | Jan. 19, 1932 |
| 1,943,603 | Hartman | Jan. 16, 1934 |
| 2,057,364 | Bystricky | Oct. 13, 1936 |
| 2,067,635 | Harris et al. | Jan. 12, 1937 |
| 2,200,396 | Martin | May 14, 1940 |
| 2,215,852 | Klein | Sept. 24, 1940 |
| 2,235,544 | Wold | Mar. 18, 1941 |
| 2,258,493 | Hull | Oct. 7, 1941 |
| 2,264,658 | Campbell | Dec. 2, 1941 |
| 2,269,423 | Barks et al. | Jan. 13, 1942 |
| 2,345,837 | Smith | Apr. 4, 1944 |
| 2,357,029 | Smith | Aug. 29, 1944 |
| 2,443,568 | Palm | June 15, 1948 |
| 2,448,459 | Palm | Aug. 31, 1948 |